(12) United States Patent
Kawazu

(10) Patent No.: US 9,965,268 B2
(45) Date of Patent: May 8, 2018

(54) METHOD AND APPARATUS FOR PREVENTING SOFTWARE VERSION ROLLBACK

(71) Applicant: CANON KABUSHIKI KAISHA, Tokyo (JP)

(72) Inventor: Ayuta Kawazu, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/201,757

(22) Filed: Jul. 5, 2016

(65) Prior Publication Data
US 2017/0010881 A1    Jan. 12, 2017

(30) Foreign Application Priority Data

Jul. 7, 2015 (JP) ................................. 2015-136367

(51) Int. Cl.
G06F 9/44 (2006.01)
G06F 9/445 (2018.01)
G06F 11/14 (2006.01)

(52) U.S. Cl.
CPC ................ *G06F 8/65* (2013.01); *G06F 8/665* (2013.01); *G06F 11/14* (2013.01); *G06F 8/71* (2013.01)

(58) Field of Classification Search
CPC ....................................................... G06F 8/65
USPC ................... 717/168–177; 709/203
See application file for complete search history.

(56) References Cited

U.S. PATENT DOCUMENTS

| | | | | |
|---|---|---|---|---|
| 4,558,413 A | * | 12/1985 | Schmidt ..................... | G06F 8/71 707/695 |
| 5,835,911 A | * | 11/1998 | Nakagawa ................ | G06F 8/65 |
| 5,901,320 A | * | 5/1999 | Takahashi ................. | G06F 8/60 709/223 |
| 6,131,088 A | * | 10/2000 | Hill ......................... | G06Q 30/02 705/26.62 |
| 6,832,373 B2 | * | 12/2004 | O'Neill ..................... | G06F 8/65 714/25 |

(Continued)

OTHER PUBLICATIONS

Nguyen et al, "Object Oriented, Structural Software Configuration Management", ACM, pp. 35-36, 2004.*

(Continued)

*Primary Examiner* — Anil Khatri
(74) *Attorney, Agent, or Firm* — Carter, DeLuca, Farrell & Schmidt, LLP

(57) ABSTRACT

This invention prevents rollback of firmware of an information processing apparatus. The apparatus including a security chip includes a counter which holds a value which monotonically increases, a version management unit which manages a current version number of software in the apparatus, a first verification unit which verifies validity of update software of the software and a version number of the update software, a rollback detection unit which detects whether a version of the update software is newer than a version of the current software, an update unit which updates the software using the update software, and a second verification unit which verifies whether the update unit has successfully updated the software. If the software has been successfully updated, the version management unit increases the value held in the counter until the value matches the version number of the update software.

7 Claims, 9 Drawing Sheets

(56) References Cited

U.S. PATENT DOCUMENTS

| | | | | |
|---|---|---|---|---|
| 6,986,132 B1* | 1/2006 | Schwabe | ............. | G06F 9/44589 717/166 |
| 7,185,332 B1* | 2/2007 | Waldin | ....................... | G06F 8/68 717/170 |
| 7,313,791 B1* | 12/2007 | Chen | ......................... | G06F 8/68 717/170 |
| 7,415,706 B1* | 8/2008 | Raju | ................... | G06F 9/44536 717/170 |
| 7,549,052 B2* | 6/2009 | Haitsma | ............ | G06F 17/30787 380/54 |
| 7,676,501 B2* | 3/2010 | Wilson | ..................... | G06F 21/64 707/999.201 |
| 7,761,543 B2* | 7/2010 | Hyndman | ................ | H04L 41/00 709/223 |
| 7,770,151 B2* | 8/2010 | Sanjar | ........................ | G06F 8/61 717/109 |
| 7,805,719 B2* | 9/2010 | O'Neill | ...................... | G06F 8/65 717/168 |
| 8,171,547 B2* | 5/2012 | Thorley | ................. | G06F 21/552 713/1 |
| 8,516,582 B2* | 8/2013 | Thorley | ................. | G06F 21/552 713/1 |
| 8,595,715 B2* | 11/2013 | Ward | ........................ | G06F 8/71 717/168 |
| 8,612,773 B2* | 12/2013 | Nataraj | ..................... | G06F 8/60 713/161 |
| 8,745,612 B1 | 6/2014 | Semenzato et al. | | |
| 8,875,116 B2* | 10/2014 | O'Neill | .................... | G06F 8/65 717/168 |
| 8,898,099 B2* | 11/2014 | Weber | ...................... | G06N 5/00 706/47 |
| 8,978,160 B2* | 3/2015 | Alrabady | .................. | G06F 8/65 713/152 |

OTHER PUBLICATIONS

Kim et al, "Program Element Matching for Multi-Version Program Analyses", ACM, pp. 58-64, 2006.*

Spinellis, "Reflection as a Mechanism for Software Integrity Verification", ACM Transactions on Information and System Security, vol. 3, No. 1, pp. 51-62, 2000.*

Brindescu et al, "How Do Centralized and Distributed Version Control Systems Impact Software Changes?", ACM, pp. 322-333, 2104.*

Shun et al, "Phase-Concurrent Hash Tables for Determinism", ACM, pp. 96-107, 2014.*

Mikkonen et al, "Elements for a Cloud-Based Development Environment: Online Collaboration, Revision Control, and Continuous Integration", ACM, pp. 14-20, 2012.*

Dalvi et al, "Optimal Hashing Schemes for Entity Matching", ACM, pp. 295-305, 2013.*

"TCG Mobile Trusted Module Specification", Trusted Computing Group, Incorporated, Version 1.0, Revision 7.02, pp. 1-103, Apr. 29, 2010.

* cited by examiner

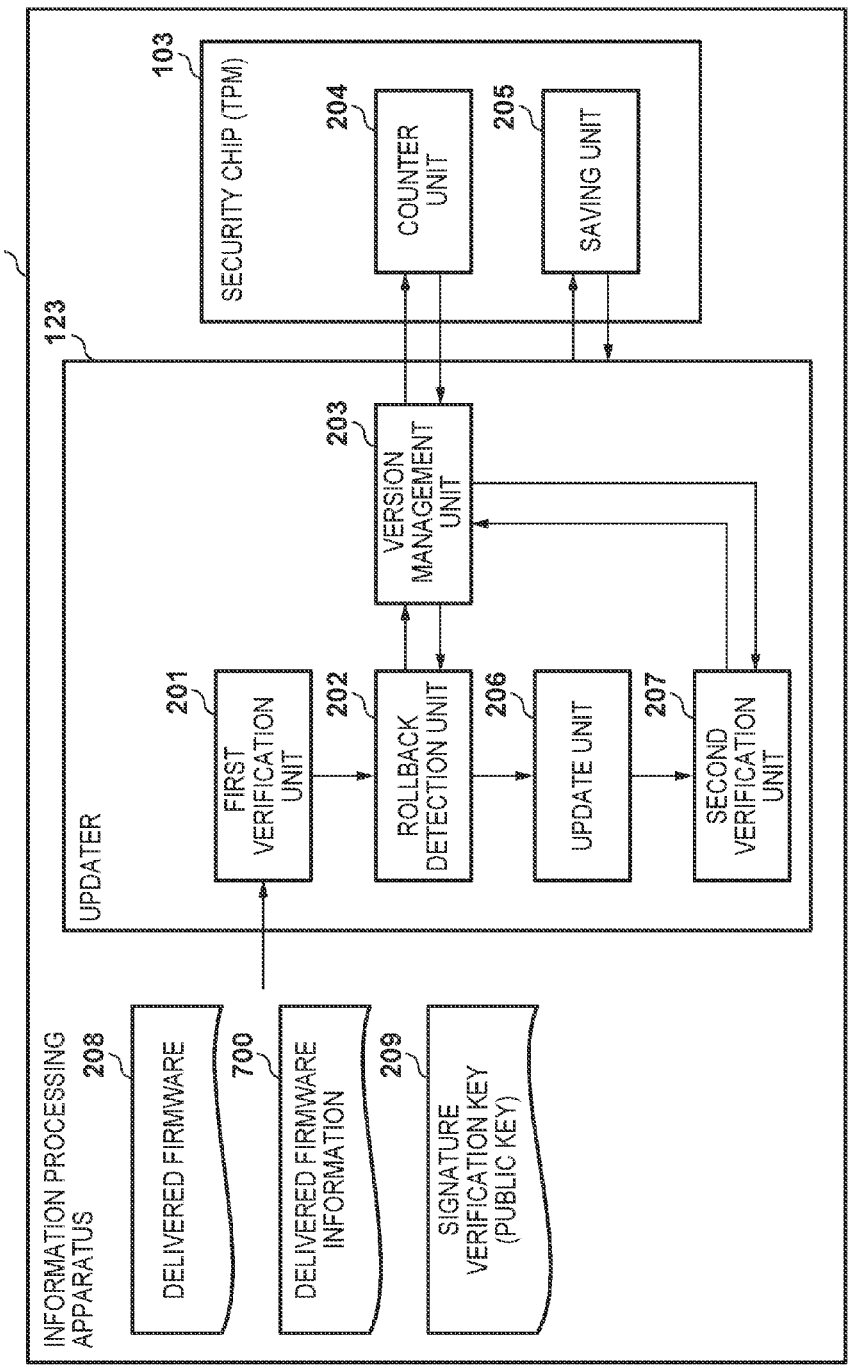

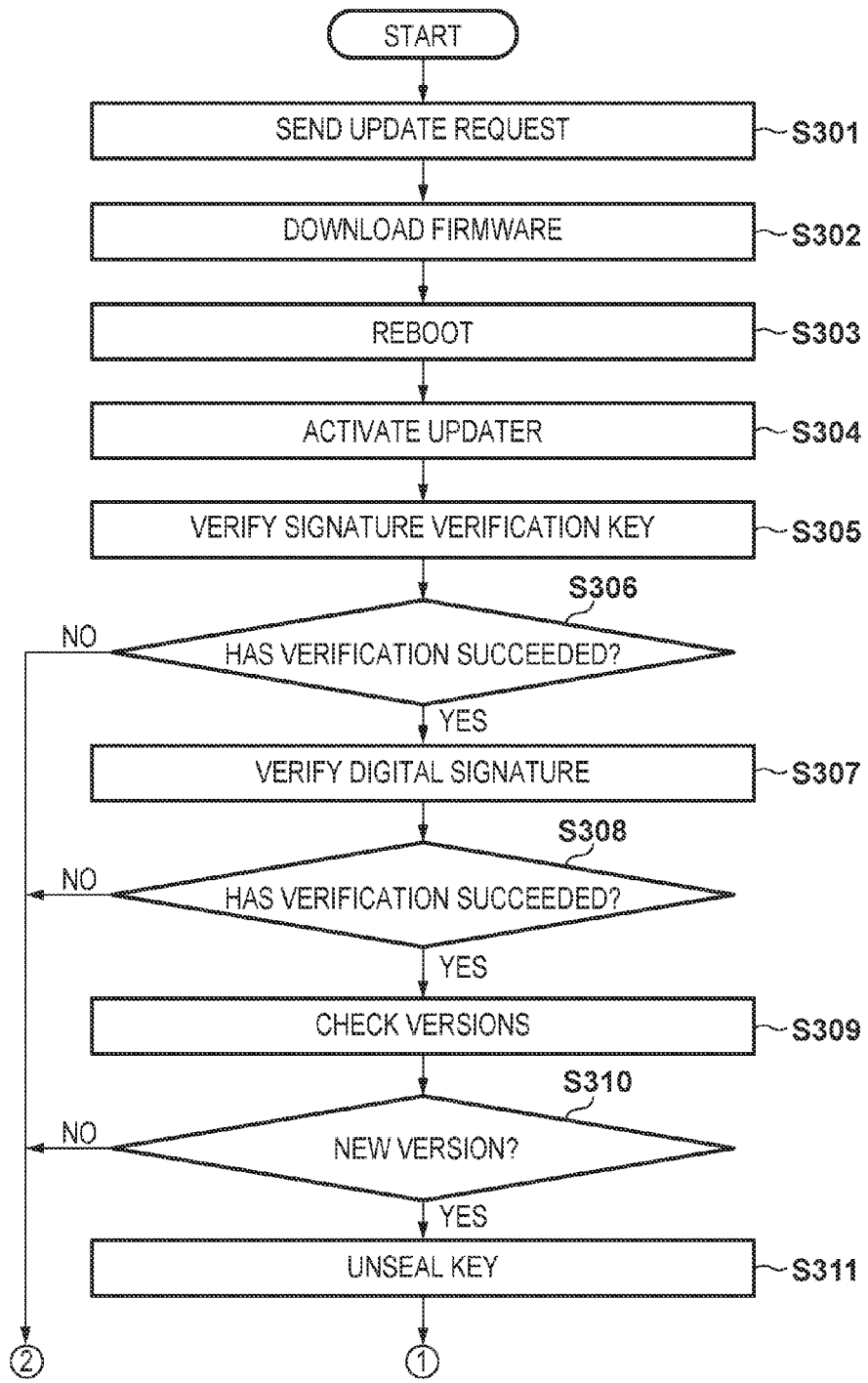

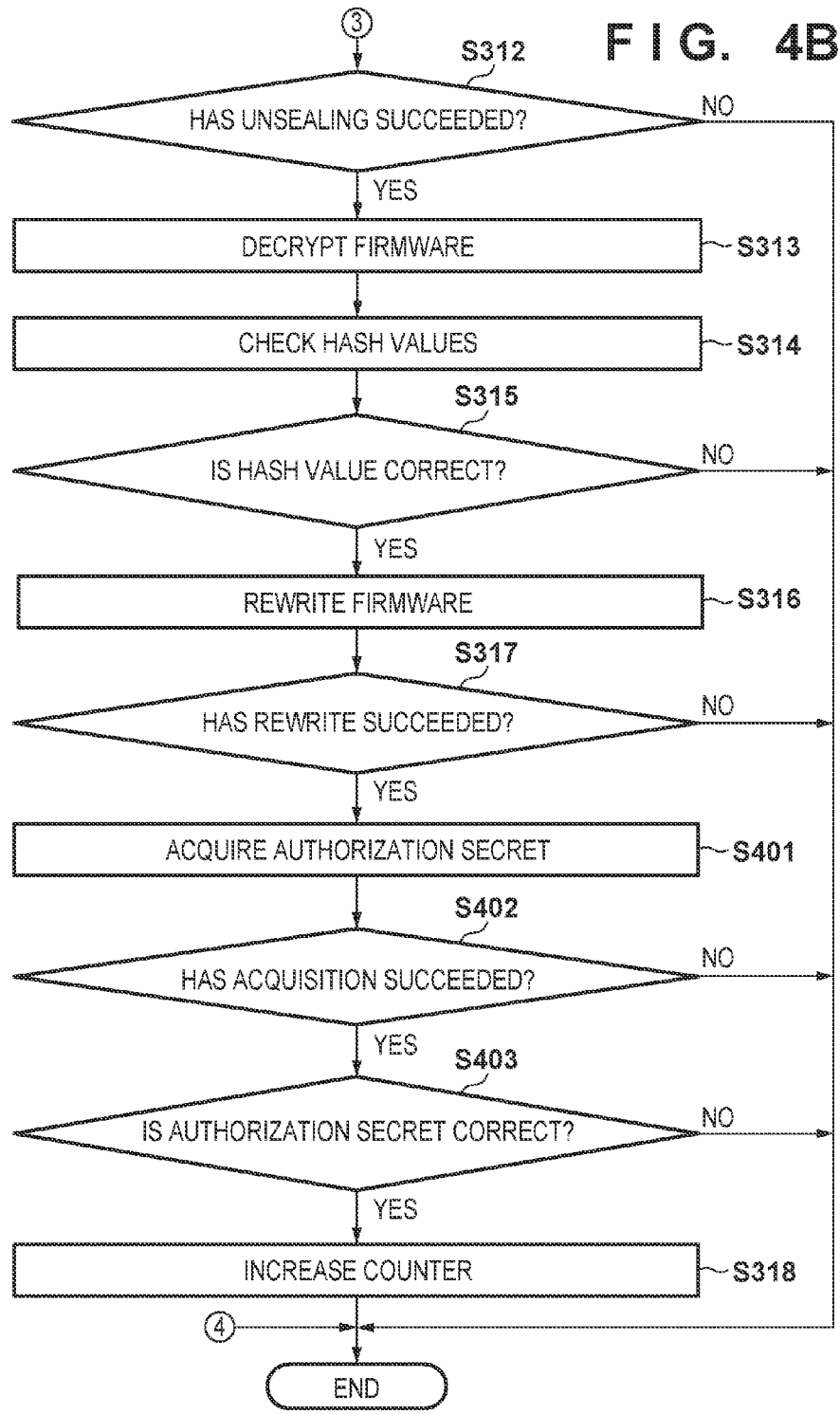

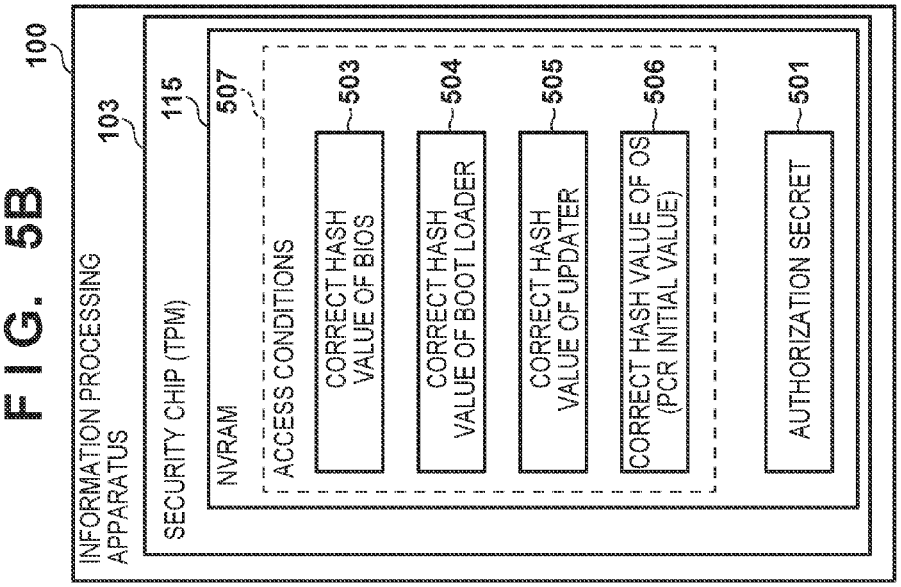
F I G. 5A
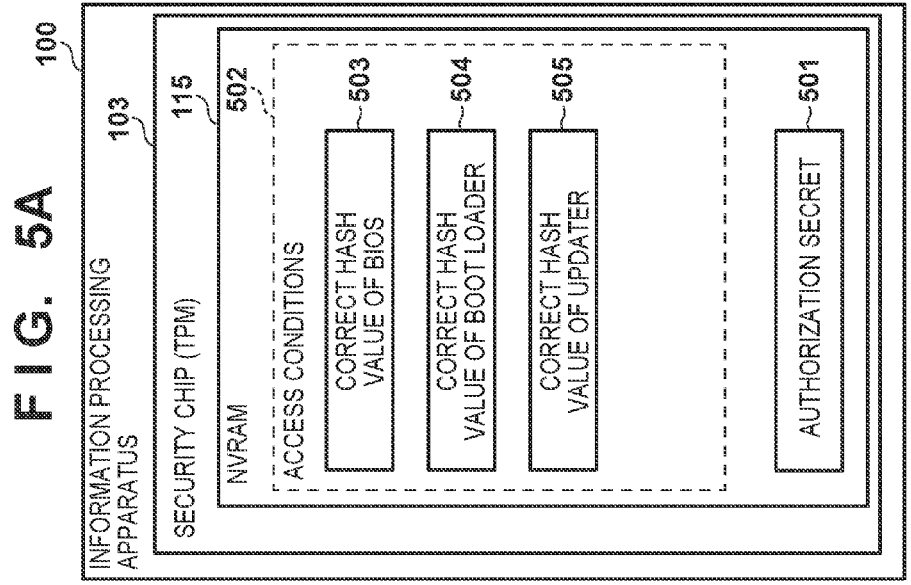
F I G. 5B

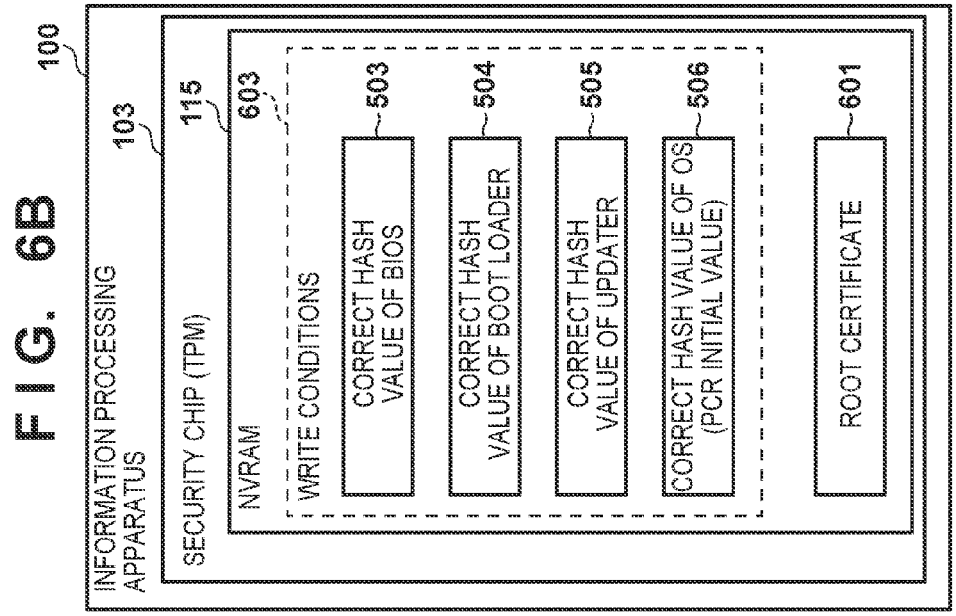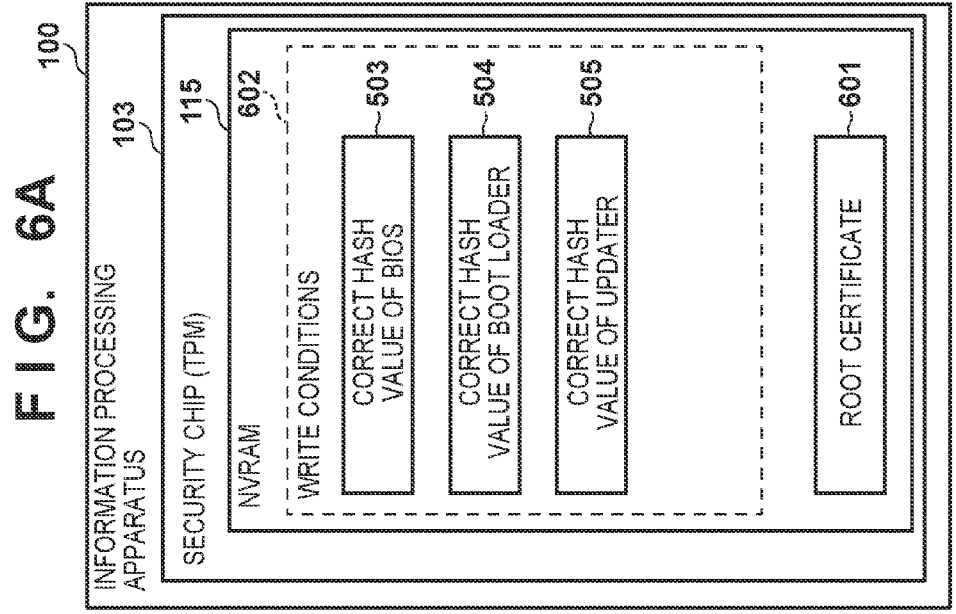

METHOD AND APPARATUS FOR PREVENTING SOFTWARE VERSION ROLLBACK

BACKGROUND OF THE INVENTION

Field of the Invention

The present invention relates to an information processing apparatus and a control method therefor and, more particularly, to a technique preferably used to prevent firmware as the basic software of the information processing apparatus from being returned (to be referred to as rollback hereinafter) to an older version.

Description of the Related Art

In an information processing apparatus such as a personal computer (PC), there is provided a conventional technique of preventing rollback of the firmware of an information processing apparatus using a TPM (Trusted Platform Module) serving as a tamper-resistant security chip. For example, U.S. Pat. No. 8,745,612 (to be referred to as patent literature 1 hereinafter) describes such technique. According to patent literature 1, rollback is detected/prevented by comparing the version number of the current firmware saved in the NVRAM (nonvolatile memory) of a TPM chip with that of delivered firmware used for update. For example, if the version number of the delivered firmware is "5" and the version number of the current firmware saved in the NVRAM of the TPM is "10", rollback is detected to cancel the update of the firmware. As another conventional technique, there is known a technique of detecting/preventing rollback by managing the version number of the current firmware by a counter (monotonically increasing counter) which is included in a TPM and only monotonically increases, and comparing the version number with the version number of a delivered firmware. For example, TCG Mobile Trusted Module Specification (Version 1.0, Revision 7.02) describes such technique (to be referred to as non-patent literature 1 hereinafter). By preventing rollback, it is possible to protect the information processing apparatus from an attack made by taking advantage of the vulnerability of old firmware.

In patent literature 1, however, since the version number of the current firmware is saved in the NVRAM of the TPM, rollback becomes possible by accessing the NVRAM and rewriting the version number in the NVRAM by an older version number. For example, by rewriting the version number in the NVRAM from "10" to "2", it is possible to return the firmware to that of one of versions "3" to "9" older than the current version number "10". On the other hand, in non-patent literature 1, since the version number is managed by the monotonically increasing counter, it is physically impossible to rewrite the version number by an older value. However, since non-patent literature 1 does not mention a timing of increasing the monotonically increasing counter, the following problem is assumed. That is, even if the update of the firmware fails and an attempt is made to return the version number of the monotonically increasing counter, the version number cannot be returned. Thus, if the timing of increasing the monotonically increasing counter is inappropriate, subsequent update becomes impossible. For example, consider a case in which firmware of a version number "2" is updated to firmware of a version number "11". In this case, the update processing increases the version number "2" managed by the monotonically increasing counter to "11". If, however, the firmware fails to be rewritten after increasing the version number, only the monotonically increasing counter is updated to "11" and the actual firmware is not updated. Therefore, even if an attempt is made again to update the firmware to that of the version number "11", this version number is not larger than that managed by the monotonically increasing counter, and thus update may become impossible.

SUMMARY OF THE INVENTION

According to an aspect of the invention, there is provided an information processing apparatus including a security chip, comprising: a counter unit configured to hold a counter value which monotonically increases; a version management unit configured to manage a current version number of software in the information processing apparatus by the counter value held in the counter unit; a first verification unit configured to verify validity of update software of the software and a version number of the update software; a rollback detection unit configured to detect, by comparing the version number of the update software with the current version number of the software held in the counter unit, whether a version of the update software is newer than a version of the current software; an update unit configured to update the software using the update software if the rollback detection unit determines that the version of the update software is newer than the version of the current software; and a second verification unit configured to verify whether the update unit has successfully updated the software, wherein if the second verification unit determines that the software has been successfully updated, the version management unit increases the version number held in the counter unit until the version number matches the version number of the update software.

According to the present invention, it is possible to prevent rollback of firmware in firmware update of an information processing apparatus.

Further features of the present invention will become apparent from the following description of exemplary embodiments (with reference to the attached drawings).

BRIEF DESCRIPTION OF THE DRAWINGS

FIG. 2 is a block diagram for explaining an example of the functional arrangement of the information processing apparatus;

FIGS. 3A and 3B are flowcharts illustrating rollback detection processing in firmware update according to the first embodiment;

FIGS. 4A and 4B are flowcharts for explaining unauthorized increase prevention processing of a monotonically increasing counter according to Modification 1;

FIGS. 5A and 5B are views for explaining access control to an authorization secret according to Modifications 1 and 2;

FIGS. 6A and 6B are views for explaining access control to a root certificate according to Modification 3.

DESCRIPTION OF THE EMBODIMENTS

An embodiment of the present invention will be described in detail below with reference to the accompanying drawings.

Embodiment

[Apparatus Arrangement]

Figure 1:
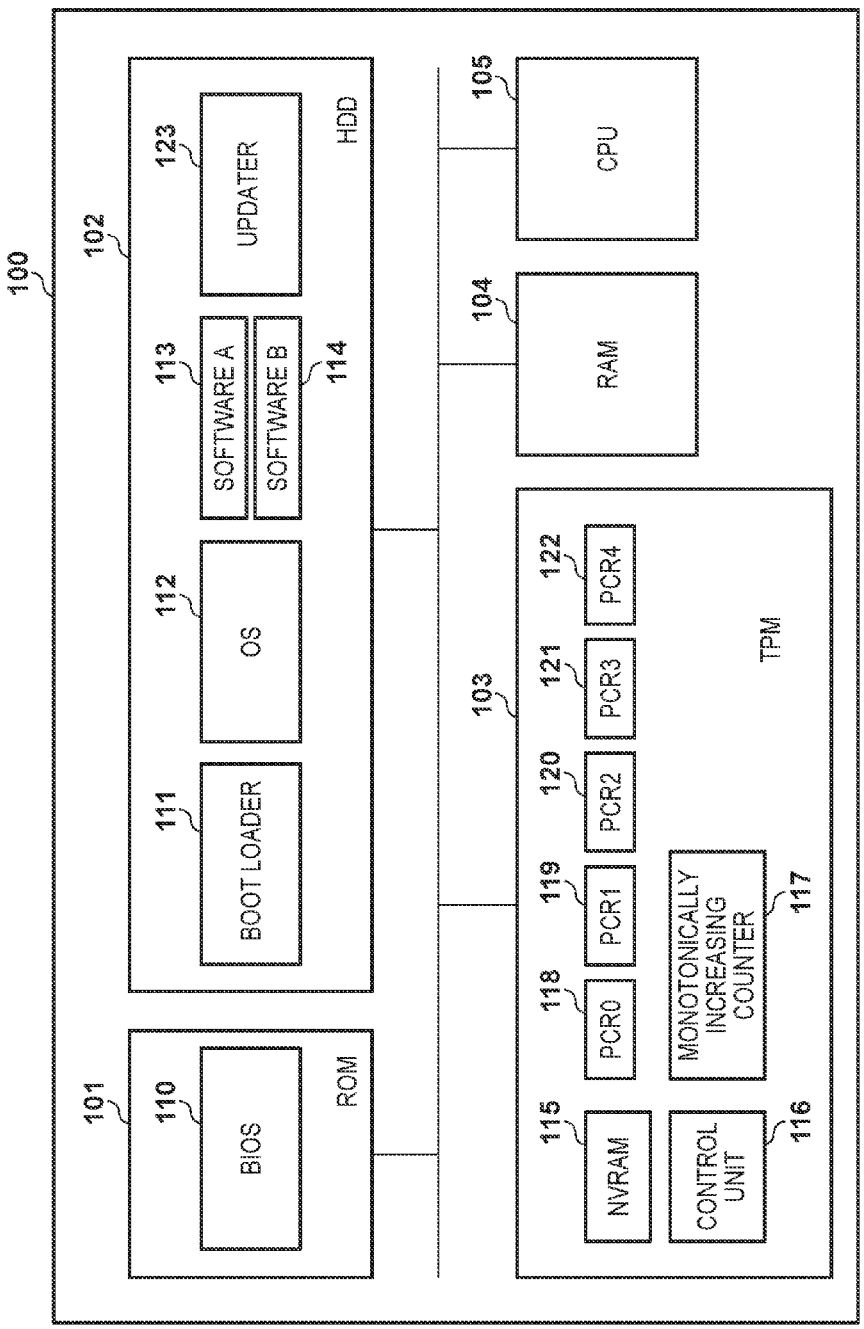
FIG. 1 is a block diagram showing an example of the arrangement of an information processing apparatus.

FIG. 1 is a block diagram showing the arrangement of an information processing apparatus 100 to which this embodiment is adaptive. The information processing apparatus 100 is, for example, a personal computer/information portable terminal widely used, an image processing apparatus capable of executing copy, scan, and print operations of image data, or an image capturing apparatus capable of capturing a digital photo. Note that in the case of an image capturing apparatus, an operation unit and image capturing unit as hardware components unique to the image capturing apparatus are included. In this embodiment, for the sake of simplicity, hardware components unique to an apparatus type are not illustrated, and FIG. 1 shows only components associated with update of firmware.

As shown in FIG. 1, the information processing apparatus 100 according to this embodiment includes a ROM 101, an HDD 102, a TPM (Trusted Platform Module) 103, a RAM 104, and a CPU 105.

The ROM 101 is a nonvolatile memory which cannot be physically or logically rewritten, and is a storage device capable of storing a BIOS 110, various software programs, and data. The BIOS 110 is software for controlling the overall information processing apparatus 100. The BIOS 110 is software which is initially activated in the information processing apparatus upon power-on of the information processing apparatus 100.

The HDD 102 is a storage device capable of storing various files including a boot loader 111, an OS (Operation System) 112, software A 113, software B 114, and an updater (update software) 123. The boot loader 111 is software for controlling activation of the OS 112 and updater 123. The OS 112 is software for controlling input/output functions such as the load of various software programs (the software A 113 and software B 114 to be described later), the memory management of the RAM 104, and screen output (not shown). The software A 113 and software B 114 are software programs for providing various functions implemented by the information processing apparatus 100, such as a mail function, word processor function, spreadsheet function, database management function, network browsing function, video/audio playback function, print function, and communication function. In this embodiment, the software for providing various functions in the HDD 102 will be described as software formed from the software A 113 and software B 114. The present invention, however, is not limited to this. The software may be formed from a larger number of software programs. The updater 123 is software having a function of rewriting, by update firmware (to be referred to as delivered firmware hereinafter), firmware (for example, the OS 112) as the basic software for controlling the information processing apparatus 100. The delivered firmware can be downloaded to the information processing apparatus via, for example, a server or a storage medium such as an SD card.

The TPM 103 is a security chip having a tamper resistance. The tamper resistance indicates a self-defense characteristic of making it difficult to externally perform analysis, and destroying internally stored software or data when an attempt is made to externally perform analysis. The TPM 103 includes an NVRAM 115, PCR0 118, PCR1 119, PCR2 120, PCR3 121, PCR4 122, monotonically increasing counter 117, and control unit 116. The monotonically increasing counter 117 is a counter which holds a counter value and cannot decrease the value, and can be implemented as a hardware counter which monotonically increases. The NVRAM 115 is a nonvolatile memory capable of performing access control (to be described later).

The PCR is an abbreviation of Platform Configuration Register, and is a volatile memory. The TPM 103 according to this embodiment includes five PCRs, that is, the PCR0, PCR1, PCR2, PCR3, and PCR4. The number of PCRs is not limited to this. The PCR0, PCR1, PCR2, PCR3, and PCR4 store the hash values of the above-described BIOS 110, boot loader 111, OS 112, software A 113, software B 114, and updater 123 and the like. The control unit 116 executes hash value saving processing in the PCR0, PCR1, PCR2, PCR3, and PCR4, encryption/decryption processing, counter value increasing processing, and the like.

The hash value saving processing in the PCRx (x is 0, 1, 2, 3, or 4) by the control unit 116 will now be described. Using a hash value Hash1 already saved in the predetermined PCR and a hash value Hash2 of software or data input from the outside of the TPM 103, the hash value saving processing calculates $$\text{Result1} = H(\text{Hash1} | \text{Hash2}) \quad (1)$$

where H(x) represents a hash function for the value x. The calculated value Result1 is saved in the corresponding PCR. As a hash function, an algorithm such as known SHA1, SHA256, or SHA512 is adaptive. "x|y" represents concatenation of the values x and y. The above-described hash value saving processing in the PCR is executed upon, for example, activation of the information processing apparatus 100.

The normal activation processing of the information processing apparatus 100 will be described first. Upon power-on of the information processing apparatus 100, the CPU 105 first executes the BIOS 110. After that, the CPU 105 sequentially loads/executes the boot loader 111, OS 112, software A 113, and software B 114. The software A 113 and software B 114 can also be selectively loaded/executed. That is, some software is not loaded/executed. It is not necessary to specifically define the load/execution order of the software A 113 and software B 114. Necessary software is loaded/executed, as needed. In addition, regardless of the load/execution of software, it is possible to save an arbitrary value as a hash value in the PCR.

Activation processing at the time of firmware update of the information processing apparatus 100 will be described next. At the time of firmware update, the basic software such as the OS is also updated. Therefore, while the OS is inactive, it is necessary to activate the updater to update the firmware. After activation of the BIOS 110, the boot loader 111 is activated, and the updater 123 is activated without activating the OS 112, thereby updating the firmware.

In this embodiment, the above-described hash value saving processing in the PCR is executed during the above-described activation processing. That is, during activation according to the BIOS 110, the CPU 105 calculates the hash value of the BIOS 110, and saves the calculated hash value in the PCR0 via the TPM 103 in accordance with equation (1). In accordance with the BIOS 110, the CPU 105 calculates the hash value of the boot loader 111, and saves the calculated hash value in the PCR1 in accordance with equation (1). After that, the CPU 105 activates the boot loader 111. After activating the boot loader 111, at the time of normal activation, the CPU 105 calculates the hash value of the OS 112 and saves the calculated hash value in the PCR3 in accordance with equation (1). After that, the CPU 105 activates the OS 112. After activating the OS 112, the CPU 105 calculates the hash value of the software before activation of the software (software A 113 and software B 114), and saves the calculated hash value in the PCR4 in accordance with equation (1), thereby activating the software. Every time the software is activated in accordance with the OS 112, the CPU 105 repeatedly executes the hash value saving processing. On the other hand, at the time of firmware update, the CPU 105 calculates the hash value of the updater 123 instead of the OS 112 in accordance with the boot loader 111, and saves the calculated hash value in the PCR2 in accordance with equation (1). After that, the CPU 105 activates the updater 123. After activating the updater, the CPU 105 updates the current firmware of the information processing apparatus 100 by the downloaded delivered firmware in accordance with the updater.

[Functional Arrangement]

FIG. 2 is a functional block diagram showing the information processing apparatus 100 according to the embodiment. The functional arrangement is implemented when the CPU 105 executes an information processing program (the updater 123) according to the embodiment. This functional arrangement can prevent the rewrite (rollback) of the firmware of the information processing apparatus 100 by firmware of an older version.

Figure 7:
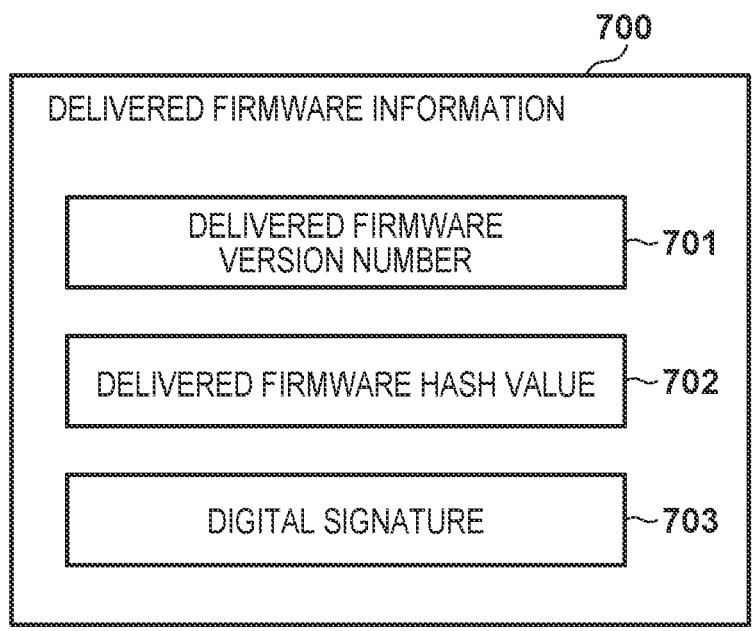
FIG. 7 is a view for explaining delivered firmware information.

A first verification unit 201 verifies whether the delivered firmware downloaded via the server or SD card and its version number have been authorized (none of them has been altered). If the firmware and its version number have not been authorized, the update of the firmware is canceled. For example, by forming delivered firmware information 700 by a delivered firmware version number 701, a delivered firmware hash value 702, and a digital signature 703, as shown in FIG. 7, whether the delivered firmware and its version number have been authorized can be verified. More specifically, whether the digital signature 703 of the delivered firmware information is correct is verified using a signature verification key (public key) 209. The signature verification key (public key) 209 is a public key paired with a signature generation key (private key) used to generate the digital signature 703. If it is verified that the digital signature 703 of the delivered firmware information 700 is correct, it is guaranteed that the delivered firmware version number 701 and delivered firmware hash value 702 which are included in the delivered firmware information 700 are correct (the validity is guaranteed). By verifying whether a hash value calculated from delivered firmware 208 matches the delivered firmware hash value 702 included in the delivered firmware information 700, it is possible to verify whether the delivered firmware 208 has been altered. This is merely an example. For example, it is possible to verify alteration of the delivered firmware by delivering, instead of the hash value of the delivered firmware, the digital signature of the delivered firmware together with the delivered firmware, and verifying the digital signature. Alternatively, whether the signature verification key (public key) has been authorized may be verified by a root certificate saved in the information processing apparatus 100 using the signature verification key (public key) 209 as a public key certificate.

A rollback detection unit 202 detects whether the version of the downloaded delivered firmware is older. If the version is older, the update of the firmware is canceled. More specifically, comparison between the delivered firmware version number 701 included in the delivered firmware information 700 verified by the first verification unit 201 and the version number of the current firmware managed by a counter unit 204 (corresponding to the monotonically increasing counter 117) of the TPM 103 (to be described later) is performed. If the delivered firmware version number 701 is smaller than the version number of the current firmware managed by the counter unit 204, it is determined that the version of the delivered firmware is older, and the update is canceled. Note that the version number of the current firmware managed by the counter unit 204 is acquired via a version management unit 203 (to be described later).

The version management unit 203 has a function of acquiring and increasing the counter value of the counter unit 204 serving as the monotonically increasing counter 117 of the TPM 103 (to be described later). The acquired counter value is transmitted to the rollback detection unit 202 or the second verification unit 207 (to be described later) in response to a request.

The counter unit 204 is a monotonically increasing counter which increases in response to an instruction of the version management unit 203, and can be implemented by, for example, the monotonically increasing counter 117 of the TPM 103. The counter unit 204 can be controlled to be increased only when authentication succeeds. For example, when increasing the counter unit 204, a password (to be referred to as an authorization secret hereinafter) is requested, and the counter unit 204 can be controlled to be increased only when the authorization secret is correct.

A saving unit 205 is a nonvolatile memory which can undergo access control, and can be implemented by, for example, the NVRAM 115 of the TPM 103. The access control function of the saving unit 205 will be described below.

Using the access control function of the saving unit 205, it is possible to control to read and write data saved in the saving unit 205 only when the hash value saved in the PCR matches a correct hash value. For example, hash values obtained when none of the BIOS 110, boot loader 111, and updater 123 is altered can be set as correct hash values in access conditions to the data saved in the saving unit 205. At this time, if any one of the BIOS 110, boot loader 111, and updater 123 has been altered, the correct hash value set in the access conditions does not match the hash value in the PCR, and thus it becomes impossible to access the data saved in the NVRAM 115. This prevents unauthorized access to the data by the altered software. Note that the above-described access control function of the saving unit 205 may be referred to as the NVRAM function of the TPM hereinafter.

An update unit 206 updates the firmware of the information processing apparatus 100 by the delivered firmware 208. The delivered firmware 208 may have been encrypted to be confidential. In this case, the update unit 206 decrypts the encrypted delivered firmware 208 using a decryption key saved in the information processing apparatus 100. To make the decryption key confidential, the above-described NVRAM function or a sealing function of the TPM can be used. For example, it is possible to prevent unauthorized access to the decryption key by the altered software by providing access control to the saving unit 205 using the NVRAM function of the TPM, and saving the decryption key in the saving unit 205.

The sealing function of the TPM 103 will be described next. The sealing function of the TPM 103 is a function of performing encryption so as to be able to perform decryption only when the hash value saved in the PCR matches the correct hash value. For example, using the sealing function, it is possible to set, as correct hash values, in decryption conditions, the hash values obtained when none of the BIOS 110, boot loader 111, and updater 123 is altered, and to encrypt the decryption key. At this time, if any one of the BIOS 110, boot loader 111, and updater 123 has been altered, the correct hash value set in the decryption conditions does not match the hash value in the PCR, and thus it becomes impossible to decrypt (unseal) the encrypted decryption key. This can prevent unauthorized read processing of the decryption key by the altered software.

Note that the above-described correct hash values are merely examples. For example, the hash values of the BIOS 110, boot loader 111, and OS 112 can be set as correct hash values. Alternatively, the hash values of the BIOS 110, boot loader 111, OS 112, and updater 123 may be set as correct hash values.

A second verification unit 207 verifies whether the update by the update unit 206 has been successfully performed. For example, whether the firmware has been correctly updated can be verified by calculating a hash value from the delivered firmware 208 written in the ROM or HDD by the update unit 206, and comparing the calculated hash value with the delivered firmware hash value 702 of the delivered firmware information 700.

If the firmware has not been correctly updated, the update is canceled after returning the firmware to the original one (the firmware before the update). It is possible to return the firmware to the original one by saving in advance the original firmware in the HDD or the like before update. This is merely an example. For example, it is also possible to return the firmware to the original one by writing the update firmware in an area different from that for the original firmware.

If it is confirmed by comparison between the hash values that the firmware has been correctly updated, the second verification unit 207 instructs the version management unit 203 to increase the version number managed by the counter unit 204. More specifically, the version number managed by the counter unit 204 is increased until it matches the value of the delivered firmware version number 701 of the delivered firmware information 700.

The above-described first verification unit 201, rollback detection unit 202, version management unit 203, update unit 206, and second verification unit 207 can be implemented as, for example, the functions of the updater 123.

It is possible to control to activate only the unaltered updater 123. For example, the hash values obtained when none of the BIOS 110, boot loader 111, and updater 123 is altered are saved as correct hash values (expected values) in the NVRAM 115 of the TPM 103. Note that the correct hash values may be saved in the HDD 102 together with a digital signature without being saved in the NVRAM 115. Before activating the boot loader 111, the BIOS 110 compares the hash value saved in the PCR1 of the TPM 103 with the correct hash value of the boot loader 111 saved in the NVRAM 115. Only if these hash values match each other, the BIOS 110 activates the boot loader 111. Before activating the updater 123, the boot loader 111 compares the hash value saved in the PCR2 of the TPM 103 with the correct hash value of the updater 123 saved in the NVRAM 115. Only if these hash values match each other, the boot loader 111 activates the updater 123. This allows only the unaltered normal updater 123 to be activated, thereby preventing unauthorized update of the firmware by the altered updater 123.

Note that the above-described activation function of the normal software may be referred to as the secure boot function of the TPM hereinafter.

[Rollback Detection Processing in Firmware Update]

Figure 3B:
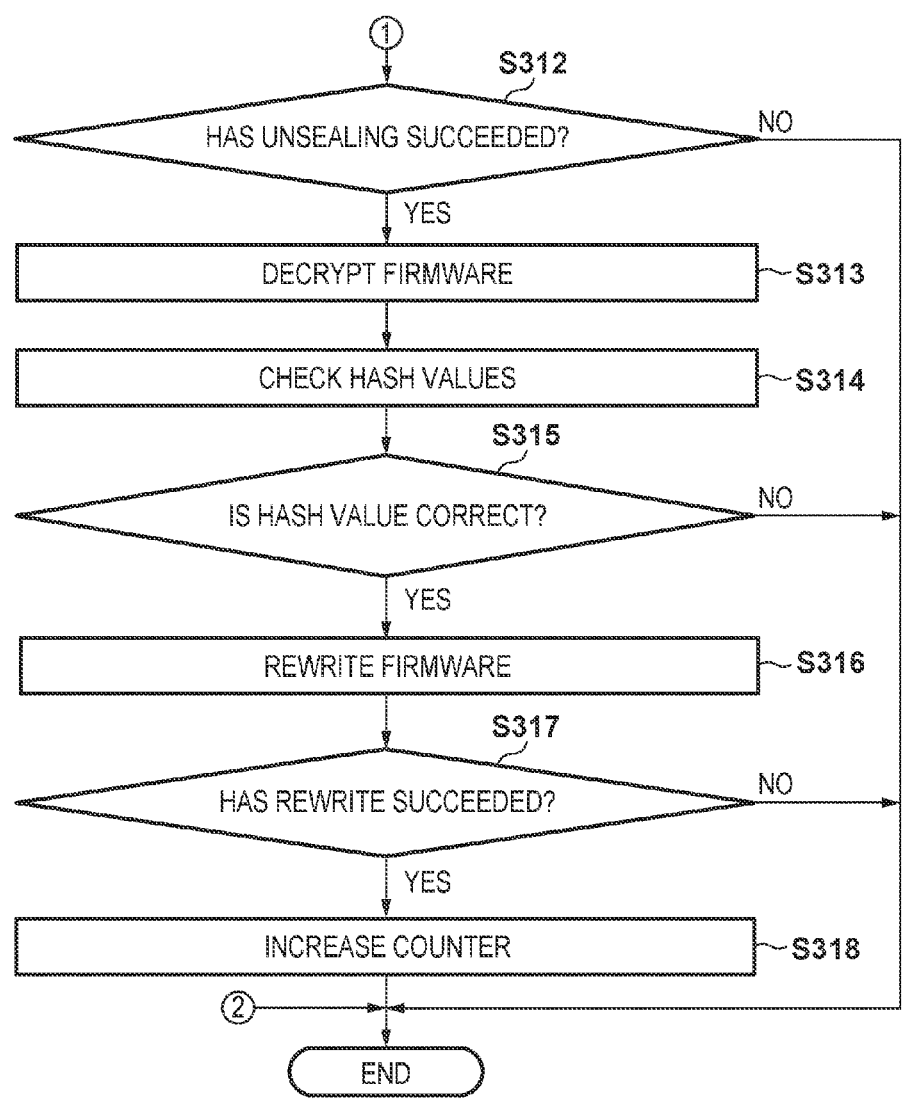

Rollback detection processing in firmware update according to this embodiment will be described with reference to a flowchart shown in FIGS. 3A and 3B.

Processing of directly updating the firmware by the delivered firmware downloaded from the server will be explained below. However, this is merely an example. Alternatively, it is possible to update the firmware of the information processing apparatus 100 by the delivered firmware saved in the storage medium such as an SD card. Furthermore, the delivered firmware is encrypted in the following example. However, if the delivered firmware need not be confidential, it need not be encrypted.

Using the communication function of the software A 113 or software B 114, the CPU 105 of the information processing apparatus 100 requests the server to update the firmware. The CPU 105 downloads the encrypted delivered firmware 208 and the delivered firmware information 700 from the server (steps S301 and S302). If the information processing apparatus 100 has no signature verification key (public key) 209, the CPU 105 also downloads the signature verification key (public key) 209 in step S302. After the download, the CPU 105 reboots, and sequentially activates the BIOS, boot loader, and updater (steps S303 and S304). Using the root certificate saved in the information processing apparatus 100, the activated updater causes the first verification unit 201 to verify whether the signature verification key (public key) 209 is correct (step S305). If verification has failed, an update failure is determined to end the processing (step S306); otherwise, the first verification unit 201 verifies the digital signature 703 included in the delivered firmware information 700 using the signature verification key (public key) 209 (step S307). If verification has failed, an update failure is determined to end the processing (step S308). If verification succeeds, the rollback detection unit 202 verifies whether the version is old, by comparing the delivered firmware version number 701 with the version number of the current firmware managed by the counter unit 204 (step S309).

If the delivered firmware version number 701 is equal to or smaller than the version number of the current firmware managed by the counter unit 204, an update failure is determined to end the processing (step S310); otherwise, the update unit 206 decrypts (unseals) the decryption key of the delivered firmware 208 encrypted by the sealing function of the TPM (step S311). If the unsealing has failed, it is determined that any one of the modules has been altered, and an update failure is determined to end the processing (step S312); otherwise, the update unit 206 decrypts the encrypted delivered firmware 208 using the unsealed decryption key (step S313). The update unit 206 verifies whether a hash value calculated from the decrypted delivered firmware matches the delivered firmware hash value 702 included in the delivered firmware information 700 (step S314). If these hash values do not match each other, an update failure is determined to end the processing (step S315); otherwise, the update unit 206 updates the firmware of the information processing apparatus 100 by the delivered firmware 208 (step S316). The second verification unit 207 verifies, by comparing the hash values, whether the firmware of the information processing apparatus 100 has been correctly updated by the delivered firmware 208 (step S317). If the firmware has not been correctly updated, the second verification unit 207 returns the firmware to the original one, and determines an update failure to end the processing; otherwise, the second verification unit 207 increases the version number of the current firmware managed by the counter unit 204 until it matches the delivered firmware version number 701 included in the delivered firmware information 700 (step S318).

As described above, it is possible to detect rollback and deal with an update failure by detecting rollback by the counter unit 204 of the TPM 103, and increasing the counter unit 204 after confirming that the firmware has been correctly rewritten.

[Modification 1]

Processing according to Modification 1 of the present invention will be described below. Note that in Modification 1, the same reference numerals as in the above embodiment denote almost the same components, and a detailed description thereof will be omitted.

Modification 1 is limited so that only the unaltered updater can increase the counter unit 204. If increase of the counter unit is not limited, the following threat is assumed. For example, an attacker may make an attack to perform unauthorized increasing processing of the counter value of the counter unit 204 via the altered updater or another software. In this case, even if an attempt is made to update the firmware to the latest one, the counter value of the counter unit 204 is set to an unauthorized large value, and thus the rollback detection unit 202 determines that the firmware is an older one, thereby disabling update.

In this modification, to deal with the above-described threat, increase of the counter unit 204 is controlled using the authorization secret so that only the normal updater can increase the counter unit 204.

[Functional Arrangement]

An example of the functional arrangement of the information processing apparatus 100 according to Modification 1 will be described with reference to the block diagram shown in FIG. 2.

As shown in FIG. 2, the functional arrangement according to Modification 1 is substantially the same as that in the embodiment, and implements access control to the authorization secret using the NVRAM function of the TPM of the saving unit 205. The counter unit 204 is controlled so as to be able to increase the counter value of the counter unit 204 only when the correct authorization secret is used.

Access control to the authorization secret will be described below with reference to FIG. 5A. An authorization secret 501 is saved in the NVRAM 115 of the TPM 103 of the information processing apparatus 100 while access control is performed by the above-described NVRAM function of the TPM. For example, a correct hash value 503 of the BIOS, a correct hash value 504 of the boot loader, and a correct hash value 505 of the updater can be set as access conditions 502 of the authorization secret 501. If any one of the BIOS 110, boot loader 111, and updater 123 has been altered, it is impossible to access the authorization secret.

Therefore, since the correct authorization secret 501 is necessary to increase the counter unit 204, it is possible to prevent an altered module from increasing the counter unit 204 by performing access control to the authorization secret 501 using the NVRAM function of the TPM, as described above.

[Unauthorized Increase Prevention Processing of Counter Unit]

Figure 4A:
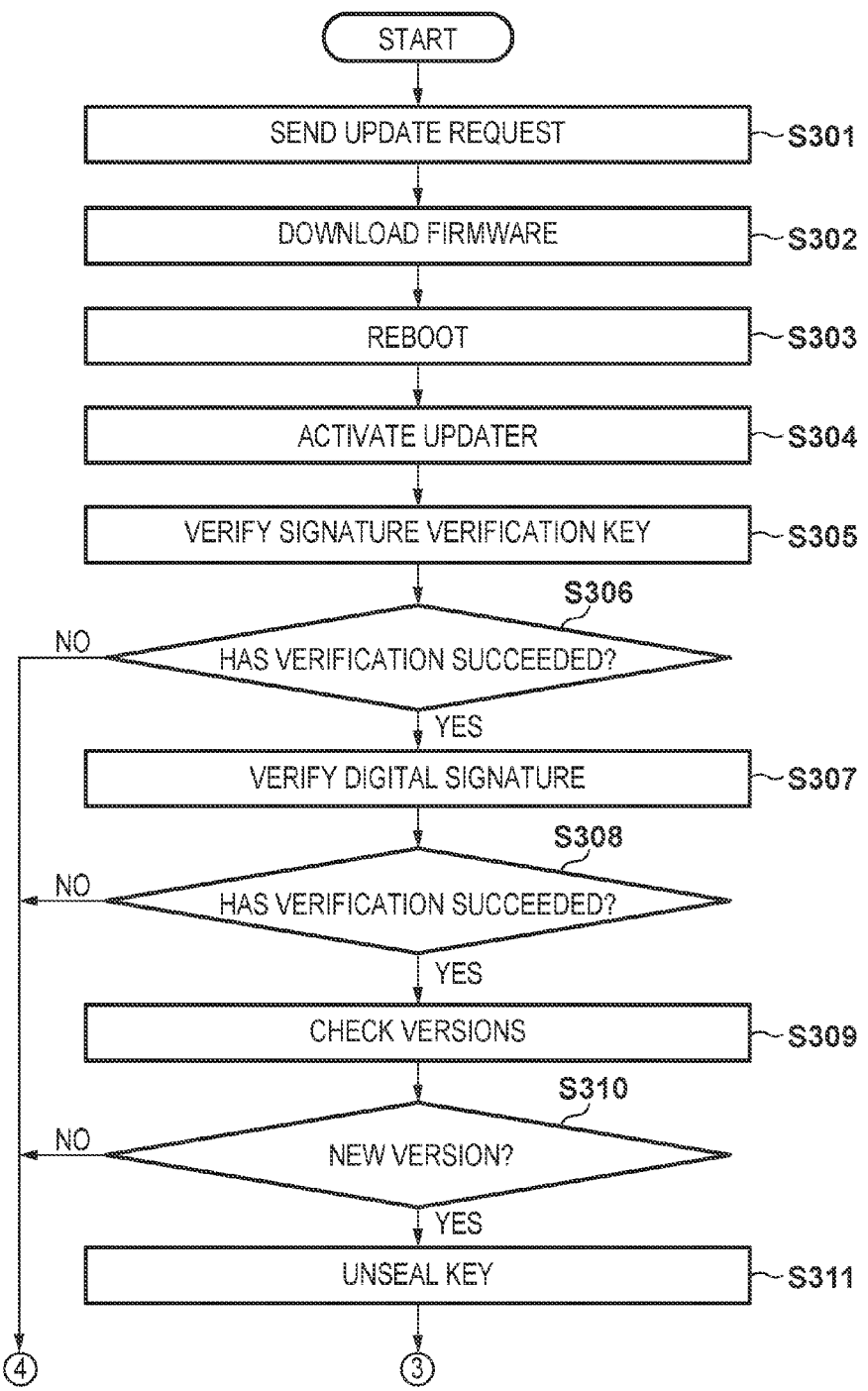

Processing of preventing unauthorized increase of the counter unit 204 according to Modification 1 will be described with reference to a flowchart shown in FIGS. 4A and 4B. The same reference symbols as those in the flowchart shown in FIGS. 3A and 3B according to the embodiment denote almost the same processes, and a description thereof will be omitted.

The updater 123 of the information processing apparatus 100 rewrites the firmware after verifying and decrypting the downloaded delivered firmware (steps S301 to S317). The second verification unit 207 of the updater 123 acquires the authorization secret saved by performing access control to the saving unit 205 using the NVRAM function of the TPM (step S401). If the authorization secret cannot be acquired due to alteration of a module or the like, an update failure is determined to end the processing (step S402); otherwise, the acquired authorization secret is used to attempt to increase the version number managed by the counter unit 204. If the authorization secret is incorrect, increase of the version number managed by the counter unit 204 fails, and an update failure is determined to end the processing (step S403); otherwise, the version number managed by the counter unit 204 is increased up to the version number of the delivered firmware (step S318).

As described above, it is possible to prevent unauthorized increase of the counter unit 204 by requesting the authorization secret for increasing the counter unit 204, and saving the authorization secret in an area which undergoes access control to prevent access by an altered module.

[Modification 2]

Processing according to Modification 2 of the present invention will be described below. Note that in Modification 2, the same reference numerals as those in the embodiment and Modification 1 denote almost the same components, and a detailed description thereof will be omitted.

In Modification 2, the initial value of the PCR is added as the correct hash value of the OS to the access conditions to the authorization secret by the NVRAM function of the TPM 103. The initial value is, for example, a value obtained by arranging "0"s of 20 bytes. According to this modification, it is possible to deal with the following threat.

For example, when the normal boot activates the OS 112, and an altered module on the OS process calculates a hash value from the updater 123, and saves it in the PCR2, the values in the PCR0, PCR1, and PCR2 match the access conditions 502 of the authorization secret 501. At this time, the altered module can undesirably access the authorization secret 501.

In Modification 2, to deal with the above-described thread, a correct hash value (PCR initial value) 506 of the OS is added to access conditions 507 to the authorization secret, as shown in FIG. 5B. By setting the initial value of the PCR as the correct hash value of the OS, the hash value of the OS is saved in the PCR once the OS is activated. Thus, the hash values do not match each other and it becomes impossible to access the authorization secret 501. Therefore, according to Modification 2, an altered module activated on the OS process cannot access the authorization secret 501. More specifically, once the OS 112 is activated, the hash value of the OS 112 is saved in the PCR3. Thus, the hash value does not match the correct hash value (PCR initial value) of the OS of the access conditions 507, and it becomes impossible to access the authorization secret 501.

As described above, it is possible to prevent unauthorized access to the authorization secret by an altered module on the OS process by setting the PCR initial value as the correct hash value of the OS in the access conditions to the authorization secret.

[Modification 3]

Processing according to Modification 3 of the present invention will be described below. Note that in Modification 3, the same reference numerals as those in the embodiment and Modifications 1 and 2 denote almost the same components and a detailed description thereof will be omitted.

According to Modification 3, the root certificate to be used for verification of the signature verification key as the processing in step S305 of FIG. 3A is protected using the NVRAM function of the TPM 103. Unlike a public key certificate such as a signature verification key, the root certificate is an originally issued certificate, and cannot thus be verified using, for example, a digital signature or the like. It is, therefore, necessary to appropriately protect the root certificate. In Modification 3, the above-described NVRAM function of the TPM 103 is used to provide access control to the root certificate. Note that since the root certificate is a public key certificate, it need not be confidential, and needs to be prevented from being altered. Therefore, access control is performed for only write processing. For example, as shown in FIG. 6A, the NVRAM function of the TPM 103 is used to set, as write conditions 602 of a root certificate 601, the correct hash value 503 of the BIOS, the correct hash value 504 of the boot loader, and the correct hash value 505 of the updater. This can prevent the altered updater from altering the root certificate. Furthermore, as shown in FIG. 6B, by setting the correct hash value (PCR initial value) of the OS as write conditions 603 of the root certificate 601, it is possible to prevent an unauthorized module activated on the OS process from altering the root certificate.

[Modification 4]

In Modifications 2, 3, and 4, the NVRAM function of the TPM 103 is used to protect the authorization secret and root certificate. However, the sealing function of the TPM may be used. In this case, it is possible to directly set, as decryption conditions of the sealing function of the TPM, the access conditions set by the NVRAM function of the TPM.

[Modification 5]

The above embodiment and modifications have described the security chip 103 as a TPM. This is merely an example. For example, any chip which has functions equivalent to the NVRAM function and sealing function of the TPM, includes the monotonically increasing counter 117, and is difficult to be analyzed may be adopted. For example, a hardware chip for performing image processing, which has the above-described functions, can be used as the security chip 103. Instead of the hardware chip, software having the equivalent functions can be used instead of the security chip 103. In this case, the software having the functions equivalent to those of the TPM can be protected by saving the software in the ROM to make alteration of it difficult or saving the software in an area which undergoes access control to prevent access by a normal module.

[Modification 6]

The above embodiment and modifications have described a case in which rollback detection is performed for the delivered firmware. This is merely an example. For example, the present invention is adaptive to rollback detection for an application as software other than the basic software.

[Modification 7]

In the above-described embodiment and modifications, the hash values are used for validity verification of the downloaded delivered firmware by the first verification unit 201 and verification, by the second verification unit, of whether the firmware has been correctly updated by the delivered firmware. However, this is merely an example. For example, since any values having a role equivalent to that of the hash values may be adopted, CRCs can be used.

The second verification unit need only be able to verify whether the delivered firmware has been correctly written. The above-described second verification unit is merely an example. For example, as another verification method, it is possible to verify whether the delivered firmware has been correctly written, by directly comparing the binary data of the delivered firmware written in the ROM or HDD with that of the downloaded delivered firmware.

In the above-described embodiment and modifications, the second verification unit verifies whether the firmware has been correctly updated by the delivered firmware. This is not essential. If verification is not necessary, it need not be performed. In this case, the function of the second verification unit becomes unnecessary.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-136367, filed Jul. 7, 2015, which is hereby incorporated by reference herein in its entirety.

What is claimed is:

1. An information processing apparatus, comprising:
   a security chip including a counter which monotonically increases a counter value;
   a central processing unit (CPU); and
   a memory storing a version number and a hash value, delivered software having the version number and the hash value, and an updater program to be executed by the CPU, wherein the updater program causes the CPU to:
   manage a current version number and a current hash value of the software having been installed in the information processing apparatus by the counter value held in the counter included in the security chip;
   verify validity of the delivered software, the version number of the delivered software, and the hash value of the delivered software and, if verification has failed, interrupt updating of the software;

if verification succeeds, determine, by comparing the version number of the delivered software with the current version number of the software held in the counter included in the security chip, whether the version number of the delivered software is newer than the current version number of the software, and, if it is determined that the version number of the delivered software is not newer than the current version number, interrupt updating of the software;

update the software using the delivered software if it is determined that the version number of the delivered software is newer than the current version number;

verify whether the software has successfully updated, and, if the software has not successfully updated, restore the software having the current version number prior to updating; and if it is verified that the software has been successfully updated, increase the version number held in the counter included in the security chip until the version number matches the version number of the delivered software.

2. The apparatus according to claim 1,
wherein the security chip includes an access controllable nonvolatile memory,
wherein when the counter, in response to receiving a request of increasing the version number, requests an authorization secret as a password, and if the authorization secret is correct, increases the version number, and
the authorization secret is saved in the access controllable nonvolatile memory when no software activated in the information processing apparatus is altered.

3. The apparatus according to claim 2, wherein the authorization secret is saved in the access controllable nonvolatile memory which undergoes access control to be accessible when an OS of the information processing apparatus is inactive.

4. The apparatus according to claim 2, wherein
the updater program causes the CPU to verify validity of the delivered software and the version number of the delivered software, using a root certificate as a public key certificate, and
the root certificate is saved in the access controllable nonvolatile memory which undergoes access control to be accessible when no software activated in the information processing apparatus is altered.

5. The apparatus according to claim 2, wherein the authorization secret is encrypted using the security chip so as to be decrypted when no software activated in the information processing apparatus is altered.

6. A control method for an information processing apparatus, comprising:
holding a counter value in a security chip including a counter which monotonically increases the counter value;
managing a current version number and a current hash value of software stored in a memory of the information processing apparatus by the counter value held in the counter included in the security chip;
verifying validity of the delivered software, the version number of the delivered software, and the hash value of the delivered software and, if verification has failed, interrupting updating of the software;

if verification succeeds, determining, by comparing the version number of the delivered software with the current version number of the software held in the counter included in the security chip, whether the current version number of the software is newer than the current version number of the software, and, if it is determined that the version number of the delivered software is not newer than the current version number, interrupting updating of the software;

updating the software using the delivered software if it is determined that the version number of the delivered software is newer than the current version number;

verifying whether the software has been successfully updated, and if the software has not successfully updated, restore the software having the current version number prior to updating and if it is verified that the software has been successfully updated, increasing, in the managing, the version number held by the counter included in the security chip until the version number matches the version number of the delivered software.

7. A non-transitory computer-readable storage medium storing a program to be executed by a processor of an information processing apparatus, wherein the processor:
holds a counter value in a security chip including a counter which monotonically increases the counter value,
manages a current version number and a current hash value of software stored in a memory of the information processing apparatus by the counter value held in the counter included in the security chip,
verifies validity of the delivered software, the version number of the delivered software, and the hash value of the delivered software and, if verification has failed, interrupts updating of the software,
if verification succeeds, determines, by comparing the version number of the delivered software with the current version number of the software held in the counter included in the security chip, whether the current version number of the software is newer than the current version number of the software, and
if it is determined that the version number of the delivered software is not newer than the current version number, interrupts updating of the software,
updates the software using the delivered software if it is determined that the version number of the delivered software is newer than the current version number,
verifies whether the software has been successfully updated, and if the software has not successfully updated, restores the software having the current version number prior to updating, and
if it is verified that the software has been successfully updated, increasing, in the management, the version number held by the counter included in the security chip until the version number matches the version number of the delivered software.

* * * * *